US012291031B2

(12) United States Patent
Murai et al.

(10) Patent No.: US 12,291,031 B2
(45) Date of Patent: May 6, 2025

(54) LIQUID DISCHARGE HEAD AND LIQUID DISCHARGE APPARATUS

(71) Applicants: Shusei Murai, Tokyo (JP); Tatsumi Suzuki, Tokyo (JP); Keiko Maruyama, Miyagi (JP); Satoshi Kudoh, Miyagi (JP); Hiroyasu Umehara, Miyagi (JP)

(72) Inventors: Shusei Murai, Tokyo (JP); Tatsumi Suzuki, Tokyo (JP); Keiko Maruyama, Miyagi (JP); Satoshi Kudoh, Miyagi (JP); Hiroyasu Umehara, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 197 days.

(21) Appl. No.: 18/176,742

(22) Filed: Mar. 1, 2023

(65) Prior Publication Data

US 2023/0286271 A1 Sep. 14, 2023

(30) Foreign Application Priority Data

Mar. 11, 2022 (JP) ................................ 2022-037977

(51) Int. Cl.
*B41J 2/14* (2006.01)

(52) U.S. Cl.
CPC .. *B41J 2/14201* (2013.01); *B41J 2002/14491* (2013.01)

(58) Field of Classification Search
CPC ..................................................... B41J 2/14201
See application file for complete search history.

(56) References Cited

U.S. PATENT DOCUMENTS

| | | | |
|---|---|---|---|
| 2013/0187976 | A1 | 7/2013 | Kobayashi |
| 2013/0293607 | A1 | 11/2013 | Kaiba et al. |
| 2015/0009254 | A1 | 1/2015 | Kaiba et al. |
| 2018/0336443 | A1 | 11/2018 | Kaiba et al. |
| 2019/0217614 | A1 | 7/2019 | Kaiba et al. |
| 2019/0272454 | A1 | 9/2019 | Kaiba et al. |
| 2020/0023580 | A1 | 1/2020 | Kaiba et al. |
| 2020/0031117 | A1 | 1/2020 | Kaiba et al. |
| 2020/0039217 | A1 | 2/2020 | Kaiba et al. |
| 2020/0272867 | A1 | 8/2020 | Kaiba et al. |
| 2020/0324312 | A1 | 10/2020 | Kaiba et al. |

(Continued)

FOREIGN PATENT DOCUMENTS

| | | |
|---|---|---|
| JP | 2004-297042 | 10/2004 |
| JP | 2013-151094 | 8/2013 |

(Continued)

OTHER PUBLICATIONS

Extended European Search Report for 23159596.8 mailed on Jul. 24, 2023.

*Primary Examiner* — Sharon Polk
(74) *Attorney, Agent, or Firm* — IPUSA, PLLC

(57) ABSTRACT

A liquid discharge head includes a nozzle forming member having a nozzle configured to discharge liquid; an opening and closing member configured to open and close the nozzle; a piezoelectric body configured to expand and contract in an axial direction in response to a drive voltage so as to actuate the opening and closing member such that the nozzle is opened and closed; a first housing member having a cylindrical shape and configured to house the piezoelectric body; and a ground member configured to contact an inner side of the first housing member.

6 Claims, 5 Drawing Sheets

(56) References Cited

U.S. PATENT DOCUMENTS

| | | | |
|---|---|---|---|
| 2022/0111405 A1 | 4/2022 | Maruyama et al. |
| 2022/0111406 A1 | 4/2022 | Kudoh et al. |
| 2022/0161562 A1 | 5/2022 | Murai et al. |

FOREIGN PATENT DOCUMENTS

| | | | |
|---|---|---|---|
| JP | 2015-160162 | | 9/2015 |
| KR | 20220133990 A | * | 10/2022 |
| WO | 2019/042585 | | 3/2019 |

* cited by examiner

LIQUID DISCHARGE HEAD AND LIQUID DISCHARGE APPARATUS

CROSS-REFERENCE TO RELATED APPLICATIONS

This application is based on and claims priority to Japanese Patent Application No. 2022-037977, filed on Mar. 11, 2022, the entire contents of which are incorporated herein by reference.

BACKGROUND OF THE INVENTION

1. Field of the Invention

The disclosures herein relate to a liquid discharge head and a liquid discharge apparatus.

2. Description of the Related Art

As an example of a liquid discharge apparatus, an ink-jet type image forming apparatus that forms an image by discharging ink to paper or the like is known.

In such an image forming apparatus, if electric charge such as static electricity is accumulated in a liquid discharge head that discharges ink, the printing quality may be adversely affected. Therefore, in order to remove the accumulated electric charge, the liquid discharge head is often provided with a ground member.

For example, Patent Document 1 (Japanese Unexamined Patent Application Publication No. 2013-151094) describes a configuration in which a ground member contacts the outer side of a liquid discharge head.

However, with the configuration in which the ground member contacts the outer side of the liquid discharge head as described in Patent Document 1, if an external shock or vibration is applied to the liquid discharge head, the ground member may be damaged or may fall off from the liquid discharge head. Thus, the grounding of the liquid discharge head may be unable to be maintained satisfactorily.

RELATED-ART DOCUMENTS

Patent Documents

Patent Document 1: Japanese Unexamined Patent Application Publication No. 2013-151094

SUMMARY OF THE INVENTION

According to an embodiment of the present disclosure, a liquid discharge head includes a nozzle forming member having a nozzle configured to discharge liquid; an opening and closing member configured to open and close the nozzle; a piezoelectric body configured to expand and contract in an axial direction in response to a drive voltage so as to actuate the opening and closing member such that the nozzle is opened and closed; a first housing member having a cylindrical shape and configured to house the piezoelectric body; and a ground member configured to contact an inner side of the first housing member.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

Figure 1:
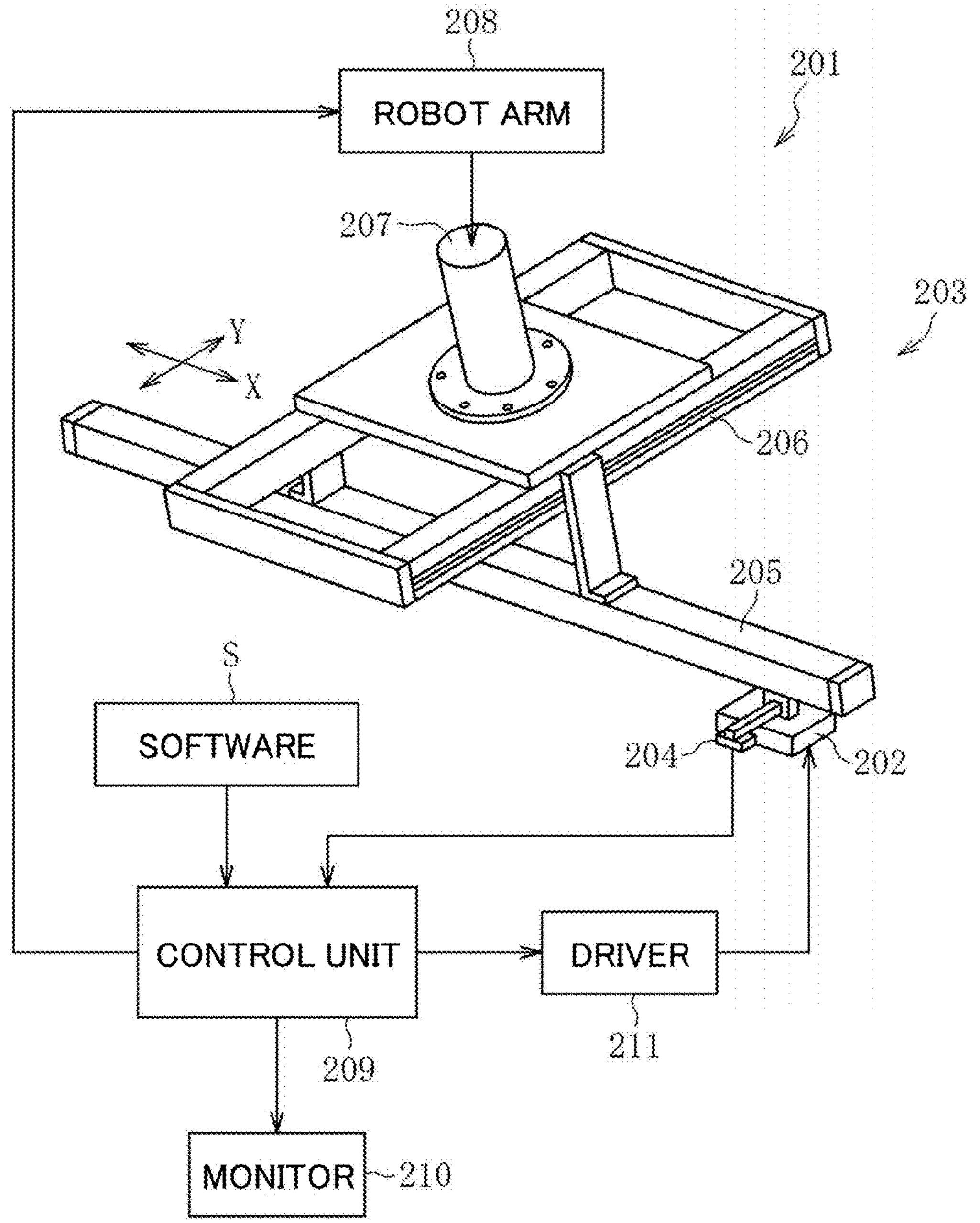
FIG. 1 is a diagram illustrating a configuration of a liquid discharge apparatus to which a liquid discharge head according to an embodiment is applied.

According to an embodiment of the present disclosure, the grounding of a liquid discharge head can be maintained satisfactorily.

In the following, embodiments of the present invention will be described with reference to the accompanying drawings. In the drawings for describing the embodiments, components such as members and constituent parts having the same functions or shapes are denoted by the same reference numerals as long as they are distinguishable, and the description thereof will not be repeated.

Figure 2:
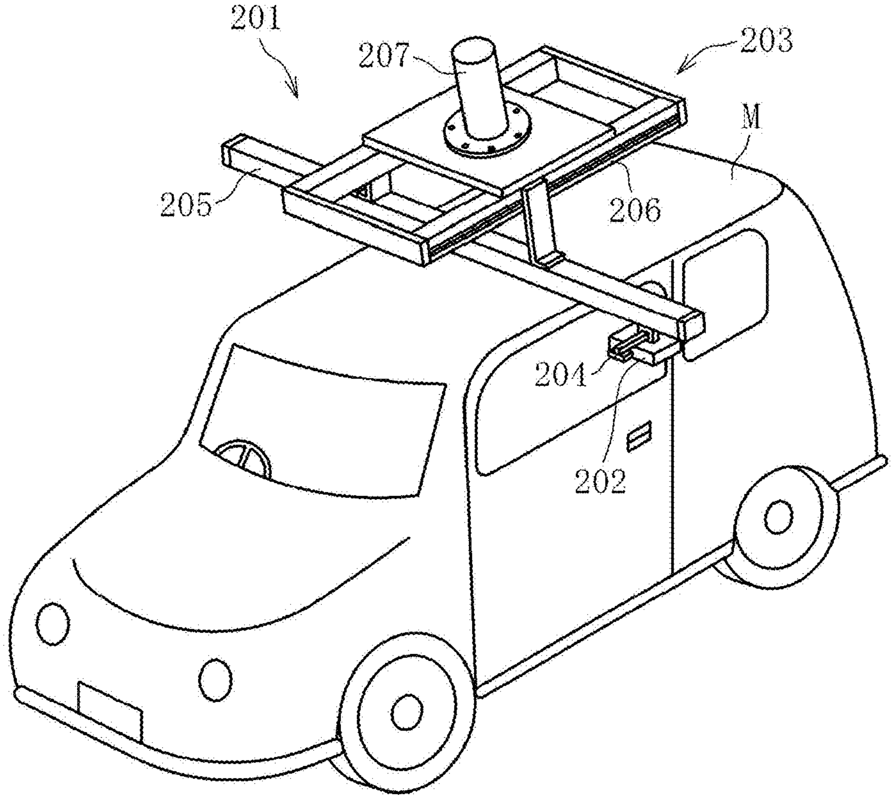
FIG. 2 is a diagram illustrating an example arrangement of a painting apparatus with respect to an automobile that is a printing target.
Figure 3:
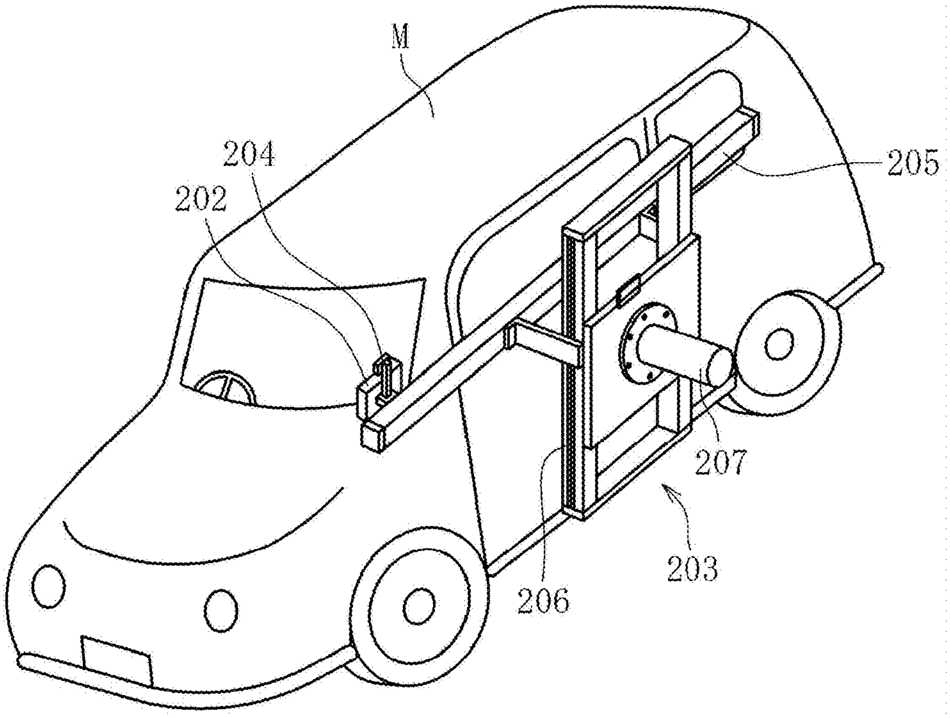
FIG. 3 is a diagram illustrating another example arrangement of the painting apparatus with respect to the automobile.

First, a configuration of a painting apparatus 201, which is an example of a liquid discharge apparatus to which a liquid discharge head according to an embodiment is applied, will be described with reference to FIG. 1 through FIG. 3. FIG. 1 is a diagram illustrating the configuration of the painting apparatus 201 according to an embodiment. FIG. 2 is a diagram illustrating an example arrangement of the painting apparatus 201 with respect to an automobile M that is a printing target. FIG. 3 is a diagram illustrating another example arrangement of the painting apparatus 201 with respect to the automobile M that is the printing target.

As illustrated in FIG. 1, the painting apparatus 201 according to the present embodiment includes a print head 202, an X-Y table 203, a camera 204, a control unit 209, a driver 211, and the like.

The print head 202 is a liquid discharge head that discharges paint (liquid) toward the painting target surface of a painting target object M. The print head 202 includes a plurality of valve nozzles, and the paint is discharged from each of the valve nozzles in a direction perpendicular to the paint discharge surface of the print head 202. That is, the paint discharge surface of the print head 202 is parallel to an X-Y plane formed by the movement of the X-Y table 203, and paint dots discharged from the valve nozzles are discharged in a direction perpendicular to the X-Y plane. The directions in which the paint is discharged from the valve nozzles are parallel to each other. Each of the valve nozzles is coupled to a paint tank of a predetermined color. The ink tank is pressurized by a pressurizing device, so that paint dots can be discharged onto the printing target surface of the painting target object M without any problem as long as the distance between each of the valve nozzles and the printing target surface is approximately 50 mm.

The X-Y table 203 includes a mechanism for moving the print head 202 and the camera 204 in the X direction and the Y direction that are orthogonal to each other. Specifically, the X-Y table 203 includes an X-axis movement mechanism 205 and a Y-axis movement mechanism 206. The X-axis movement mechanism 205 moves a slider that holds the print head 202 and the camera 204, which will be described later, in the X direction, and the Y-axis movement mechanism 206 moves the X-axis movement mechanism 205 in the Y direction while holding the X-axis movement mechanism 205 by two arms. A shaft 207 is provided on the Y-axis movement mechanism 206. The shaft 207 is held and driven by a robot arm 208 such that the print head 202 can be freely arranged at a predetermined position where printing is to be performed on the painting target object M. For example, if the painting target object M is an automobile, the print head 202 can be arranged at an upper position of the automobile as illustrated in FIG. 2 or at a side position of the automobile as illustrated in FIG. 3. Note that the operation of the robot arm 208 is controlled based on a program that is stored in the control unit 209 in advance.

The camera 204 is an image capturing device, such as a digital camera, that captures images of the printing target surface of the painting target object M. The camera 204 captures images of a predetermined range of the printing target surface of the painting target object M at fixed fine intervals while moving in the X direction and the Y direction by the X-axis movement mechanism 205 and the Y-axis movement mechanism 206. Specifications of lenses, resolution, and the like of the camera 204 are appropriately selected, such that the camera 204 can capture a plurality of sub-divided images of the predetermined range of the printing target surface. The camera 204 captures a plurality of sub-divided images of the printing target surface continuously and automatically as controlled by the control unit 209, which will be described later.

The control unit 209 moves the X-Y table 203 based on image editing software S for editing an image captured by the camera 204 and a preset control program so as to control the printing operation (paint discharging operation) of the print head 202. The control unit 209 is constituted by what is known as a microcomputer. The control unit 209 includes a storage device that records and stores various programs, data of captured images, data of images to be printed, and the like, a central processing unit that executes various processes according to programs, and input devices such as a keyboard and a mouse. The control unit 209 includes a digital versatile disc (DVD) player and the like as necessary. Further, the control unit 209 includes a monitor 210. The monitor 210 displays information input into the control unit 209, results processed by the control unit 209, and the like.

The control unit 209 uses image processing software to perform image processing on a plurality of pieces of sub-divided image data captured by the camera 204, and generates a composite print surface obtained by projecting the printing target surface of the painting target object M, which is not planar, onto a plane. Further, the control unit 209 superimposes, on the composite print surface, a rendering target image A that is to be printed such that the rendering target image A is continuous with an image already printed on the printing target surface, and edits the rendering target image A such that the rendering target image A is continuous with the edge portion of the already-printed image, thereby generating an edited image B. Then, by discharging paint from the print head 202 based on the edited image B, a new image is printed without any gap between the new image and the already-printed image. Note that the operation of capturing a plurality of sub-divided images by the camera 204 and the operation of printing an image by discharging paint from each of the nozzles of the print head 202 are performed by the driver 211 as controlled by the control unit 209.

Figure 4:
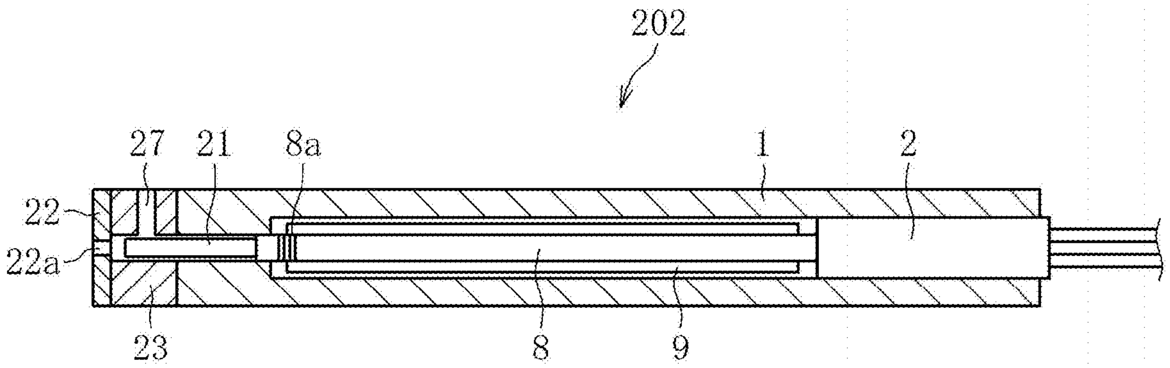
FIG. 4 is a cross-sectional view illustrating an overall configuration of a print head according to the embodiment.

Next, a configuration of the print head according to the embodiment will be described with reference to FIG. 4 and FIG. 5. FIG. 4 is a cross-sectional view illustrating an overall configuration of the print head according to the embodiment. FIG. is a partially enlarged cross-sectional view of the print head of FIG. 4.

As illustrated in FIG. 4, the print head 202 according to the embodiment is a valve-type liquid discharge head. The print head 202 includes a nozzle plate 22 that serves as a nozzle forming member having a nozzle **22*a* (discharge port) configured to discharge paint (liquid), a liquid chamber 23, a needle 21 that serves as an opening and closing member configured to open and close the nozzle 22*a*, a piezoelectric body 9, a piezoelectric frame 8, an outer housing 1 that serves as a first housing member, and an inner housing 2** that serves as a second housing member.

The outer housing 1 is a member that has a cylindrical shape and houses the needle 21, the piezoelectric body 9, the piezoelectric frame 8, the inner housing 2, and the like. The nozzle plate 22 is provided at the left end, as viewed in FIG. 4, of the outer housing 1 via the liquid chamber 23. The liquid chamber 23 is provided with a liquid flow channel 27, and the paint is supplied from the outside into the liquid chamber 23 through the liquid flow channel 27.

The piezoelectric frame 8 holds the piezoelectric body 9 so as to sandwich both ends in the longitudinal direction of the piezoelectric body 9. The right end, as viewed in FIG. 4, of the piezoelectric frame 8 is positioned with respect to the inner housing 2 and is fixed to the inner housing 2. The needle 21 is supported on the left end, as viewed in FIG. 4, of the piezoelectric frame 8. A cornice-shaped deformable part **8*a* that can expand and contract in the axial direction of the housing 1 (in the horizontal direction in FIG. 4) is provided in the vicinity of the left end, as viewed in FIG. 4, of the piezoelectric frame 8. When the piezoelectric body 9 expands and contracts in the axial direction in response to the application of a drive voltage, the deformable part 8*a* also expands and contracts in the axial direction. As a result, the needle 21 supported by the piezoelectric frame 8 is moved in the axial direction, and the nozzle 22*a* is opened and closed by the needle 21. As illustrated in FIG. 4, in a state in which the needle 21 is moved rightward and the nozzle 22*a* is opened, the paint within the liquid chamber 23 is discharged from the nozzle 22*a***.

Figure 5:
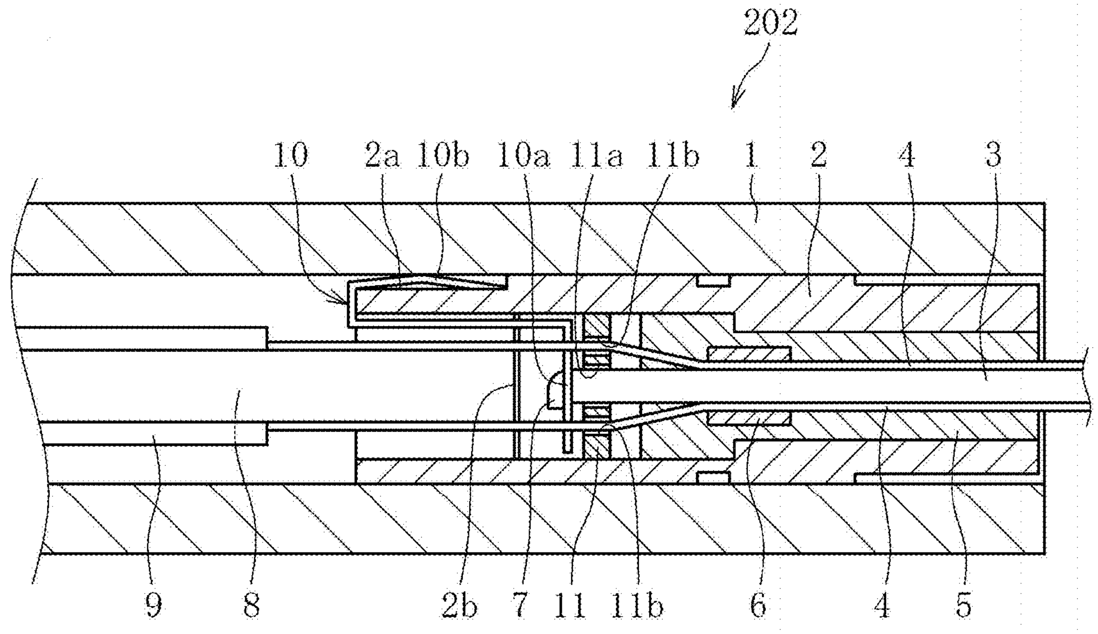
FIG. 5 is a partially enlarged cross-sectional view of the print head of FIG. 4.

As illustrated in FIG. 5, the inner housing 2 is formed in a cylindrical shape, and a lead wire 4 that serves as a supply wire for supplying the drive voltage to the piezoelectric body 9 is inserted through the inner housing 2. The piezoelectric body 9 is electrically connected to an external power source via the lead wire 4, and the drive voltage is applied from the power source to the piezoelectric body 9 via the lead wire 4.

The inner housing 2 includes a frame positioning portion **2*b* on the inside (inner wall) of the inner housing 2. The frame positioning portion 2*b* positions the piezoelectric frame 8. The right end, as viewed in FIG. 5, of the piezoelectric frame 8 is inserted into the inner housing 2 and contacts the frame positioning portion 2*b*, thereby causing the piezoelectric frame 8 to be positioned axially with respect to the inner housing 2**.

Further, a ground wire (an earth wire) 3 that is electrically connected to an external grounding point is inserted into the inner housing 2. The ground wire 3 is held together with the lead wire 4 by a binding heat-shrink tube 6 that serves as a holding member housed in the inner housing 2. Further, the ground wire 3 and the lead wire 4 are supported by a wiring support disk 11 that serves as a support member housed in the inner housing 2. The wiring support disk 11 has a hole 11*a* in the center thereof and a hole 11*b* on the outer diameter side relative to the hole 11*a*. The ground wire 3 is inserted through the hole 11*a*, and the lead wire 4 is inserted through the hole 11*b*. As illustrated in FIG. 5, in the inner space of the inner housing 2, a part located on the right side relative to the wiring support disk 11, that is, a part including the binding heat-shrink tube 6 is filled with a resin 5.

The ground wire 3 is constituted by a conductive wire and an insulating portion that covers the conductive wire. The left end, as viewed in FIG. 5, of the ground wire 3 serves as an exposed portion 7 where the conductive wire is exposed. The exposed portion 7 is electrically connected to a leaf spring 10 that servers as a ground member. The leaf spring 10 includes a ground wire connector 10*a* disposed in the inner housing 2. The exposed portion 7 is electrically connected to the ground wire connector 10*a*.

The leaf spring 10 is attached to and supported by the inner housing 2. As illustrated in FIG. 5, in a state in which the leaf spring 10 is attached to the inner housing 2, a contact portion 10*b* of the leaf spring 10 is disposed on a grooved portion 2*a* provided on the outer peripheral surface of the inner housing 2. Further, the contact portion 10*b* of the leaf spring 10 is interposed between the inner housing 2 and the outer housing 1 while being elastically deformed, and the leaf spring 10 (contact portion 10*b*) resiliently contacts the outer peripheral surface (grooved portion 2*a*) of the inner housing 2 and the inner peripheral surface of the outer housing 1 by the resilient preload of the contact portion 10*b*.

As described, in the print head according to the present embodiment, the leaf spring 10, which serves as the ground member, resiliently contacts both the outer housing 1 and the inner housing 2, thereby causing the outer housing 1 and the inner housing 2 to be electrically connected (grounded) to the external grounding point via the leaf spring 10 and the ground wire 3. Accordingly, even if electric charge is accumulated in the outer housing 1 and the inner housing 2, the accumulated electric charge can be removed via the leaf spring 10 and the ground wire 3.

In addition, in the print head according to the present embodiment, the leaf spring 10, which serves as the ground member, is housed in the outer housing 1. Therefore, even if an external shock or vibration is applied to the print head, the leaf spring 10 can be prevented from being damaged or falling off from the print head. Accordingly, the grounding of the print head can be maintained satisfactorily.

Further, since the leaf spring 10 is attached to the inner housing 2, the leaf spring 10 and the inner housing 2 can be integrally inserted into and removed from the outer housing 1. As described, in the print head according to the present embodiment, since the leaf spring 10 and the inner housing 2 are integrally insertable into and removable from the outer housing 1, work of replacing housing components including the leaf spring 10 can be easily performed.

Further, the inner housing 2 to which the leaf spring 10 is attached also serves as a member for positioning the piezoelectric body 9 and the piezoelectric frame 8. Therefore, when the inner housing 2 is inserted into the outer housing 1, both the grounding of the outer housing 1 and the inner housing 2 and the positioning of the piezoelectric body 9 and the piezoelectric frame 8 can be performed. In the present embodiment, first, the piezoelectric body 9 and the piezoelectric frame 8 are inserted into the outer housing 1, and subsequently, the inner housing 2, to which the leaf spring 10 is attached, is inserted into the outer housing 1 from the right side toward the left side as viewed in FIG. 5. As a result, the outer housing 1 and the inner housing 2 are grounded via the leaf spring 10 and also the piezoelectric body 9 and the piezoelectric frame 8 are positioned. Accordingly, with the configuration according to the present embodiment, grounding work and assembly work of the print head can be simplified.

Further, in the print head according to the present embodiment, the ground wire 3 and the lead wire 4 are supported by the wiring support disk 11, thereby preventing the ground wire 3 and the lead wire 4 from being displaced in the inner housing 2 and contacting surrounding members such as the inner housing 2. Further, as viewed in a direction in which the inner housing 2 is inserted into the outer housing 1 (as viewed from the right side in FIG. 5), the ground wire 3 and the lead wire 4 are supported by the wiring support disk 11 at mutually different positions (without contacting each other). Therefore, the ground wire 3 and the lead wire 4 can be reliably prevented from contacting each other.

As described, in the print head according to the present embodiment, the ground wire 3 and the lead wire 4 are supported so as not to contact each other or other surrounding members. Therefore, the ground wire 3 (exposed portion 7) can be prevented from falling off from the ground wire connector 10*a* of the leaf spring 10 and resulting in poor grounding, and also, poor connection between the lead wire 4 and the piezoelectric body 9 can be prevented. Accordingly, in the print head according to the present embodiment, the grounding of the outer housing 1 and the inner housing 2 and an electrical connection between the piezoelectric body 9 and the power source can be satisfactorily ensured.

Figure 6:
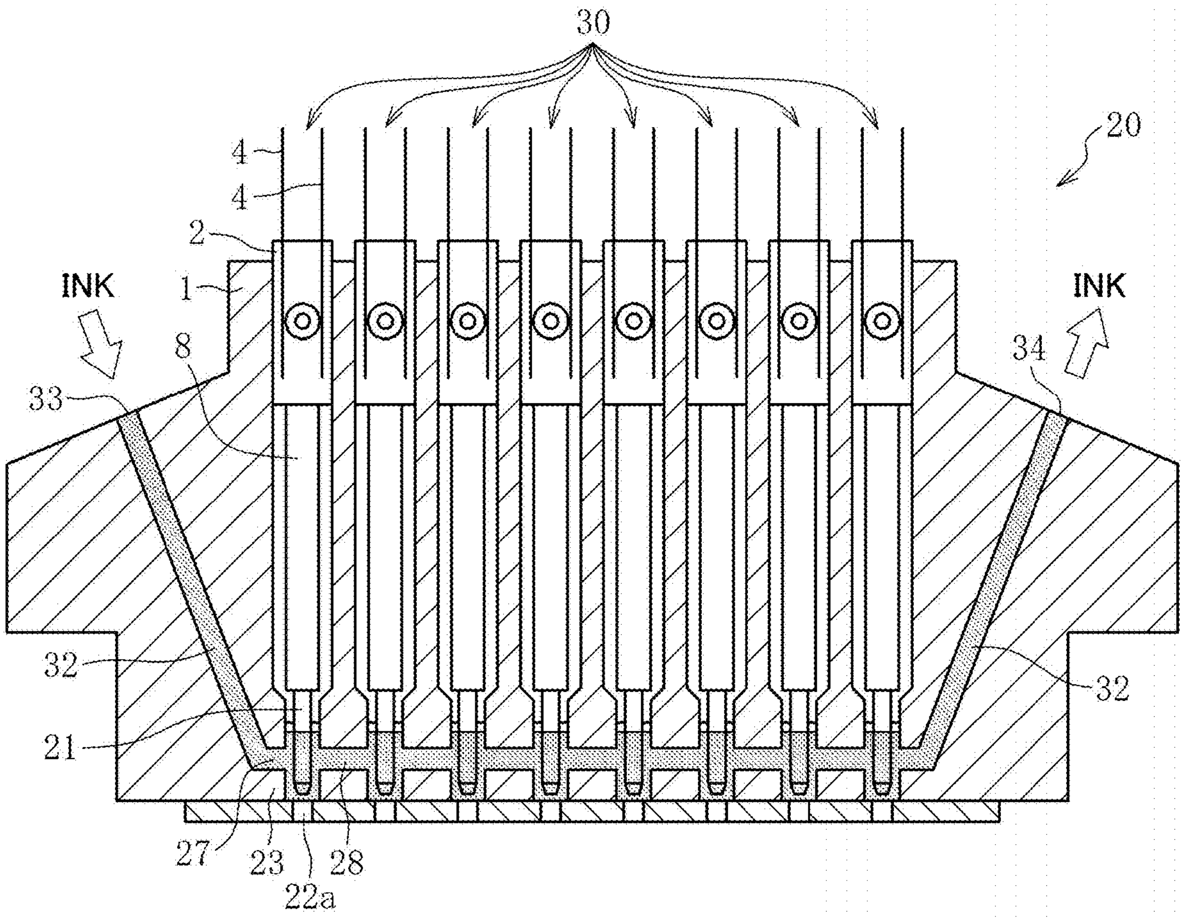
FIG. 6 is a diagram illustrating a configuration of a head unit including liquid discharge heads according to an embodiment.

Next, a head unit including liquid discharge heads (print heads) according to an embodiment will be described with reference to FIG. 6. FIG. 6 is a cross-sectional view illustrating a configuration of a head unit including liquid discharge heads according to an embodiment.

As illustrated in FIG. 6, a head unit 20 according to an embodiment includes a plurality of (in the example illustrated in FIG. 6, eight) liquid discharge heads 30, a liquid supply channel 32 for supplying paint (liquid) to the liquid discharge heads 30, a liquid supply port 33 for supplying the paint to the liquid supply channel 32, and a liquid discharge port 34 for discharging the paint from the liquid supply channel 32.

The basic configuration of the plurality of liquid discharge heads 30 is the same as that described with reference to FIGS. 4 and 5, and components corresponding to those of FIGS. 4 and 5 are denoted by the same reference numerals in FIG. 6.

In the head unit 20 illustrated in FIG. 6, the eight liquid discharge heads 30 are provided such that respective nozzles (discharge ports) 22*a* are arranged at substantially equal intervals in one direction (in the horizontal direction in FIG. 6). The liquid discharge heads 30 extend in the vertical direction so as to discharge paint downward from the respective nozzles 22*a* on the lower side of FIG. 6. Each of the liquid discharge heads 30 is rotated by substantially 90 degrees counterclockwise from the state illustrated in FIG. 4, centering on the nozzle 22*a* side.

The liquid supply channel 32 is provided such that the liquid supply channel 32 penetrates through liquid chambers 23 of the respective liquid discharge heads 30, thereby enabling paint to flow from one side (the left side of FIG. 6) to the other side (the right side of FIG. 6) in the arrangement direction of the eight liquid discharge heads 30. That is, for each of the liquid discharge heads 30, the liquid supply channel 32 is provided with, in addition to a liquid flow channel 27 into which paint is injected, a discharge port 28 for discharging the paint on the side opposite to the liquid flow channel 27.

In the head unit 20 illustrated in FIG. 6, the liquid discharge port 34 is usually closed by a valve or the like. Therefore, the liquid supply channel 32 is usually filled with paint supplied from the liquid supply port 33 as illustrated in FIG. 6. In this state, when the nozzles 22*a* are opened by needles 21 of the respective liquid discharge heads 30, the paint is discharged from the each of the nozzles 22*a* of the liquid discharge heads 30. Conversely, when cleaning of the head unit 20 is performed, the valve of the liquid discharge port 34 is configured to be opened such that the inside of the head unit 20 can be easily cleaned. In the head unit 20 illustrated in FIG. 6, an inner housing 2 of one of the eight liquid discharge heads 30 may be provided with a leaf spring 10, which serves as a ground member, or inner housings 2 of all of the eight liquid discharge heads 30 may be provided with leaf springs 10.

Figure 7:
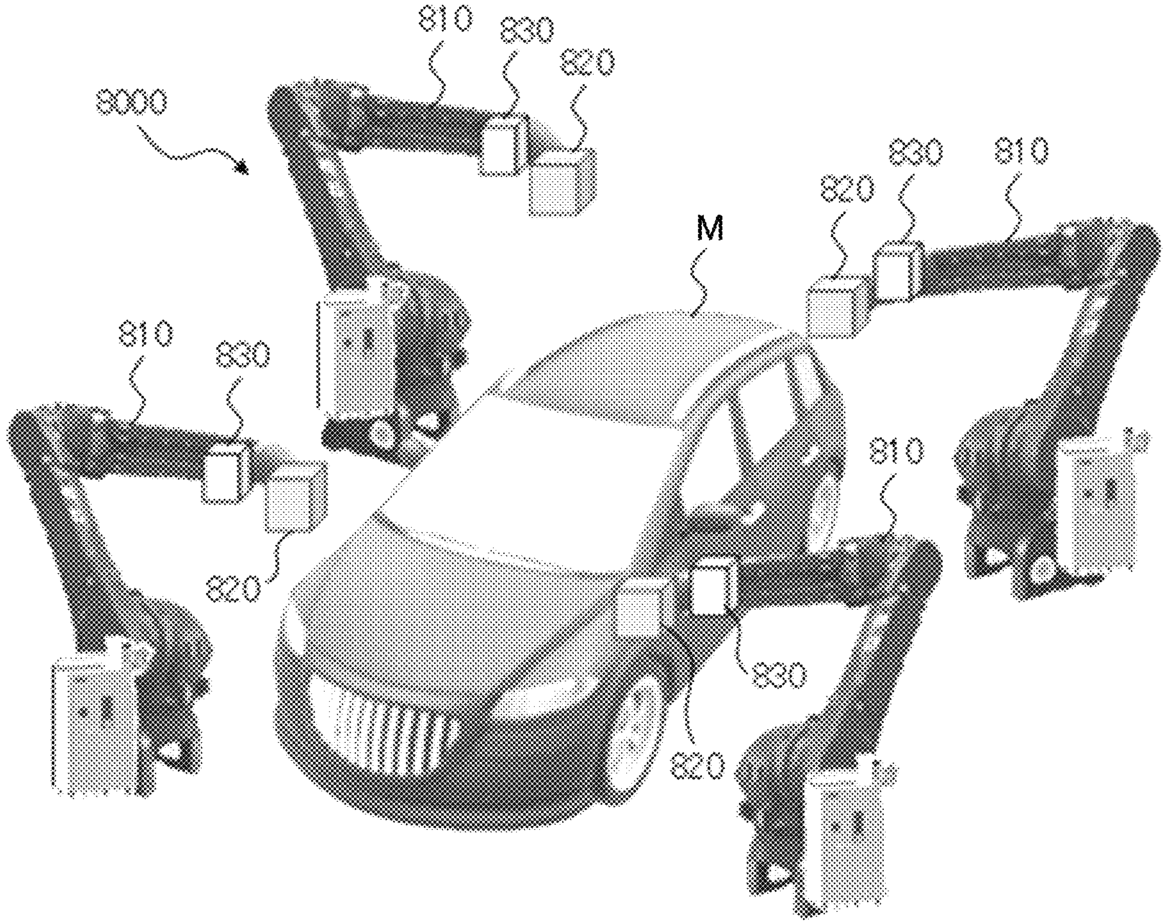
FIG. 7 is a diagram illustrating another painting apparatus to which the liquid discharge heads according to the embodiment is applied.

Instead of the painting apparatus 201 as illustrated in FIG. 1, the present invention can be applied to a painting apparatus 8000 configured to paint the body of an automobile as illustrated in FIG. 7, for example. The painting apparatus 8000, serving as a liquid discharge apparatus, includes a robot arm 810 having a plurality of joints so as to be freely movable like a human arm. The painting apparatus 8000 includes a head unit 820 including eight liquid discharge heads 30 configured to discharge liquid at the tip of the robot arm 810. In addition, the robot arm 810 includes a 3D sensor 830 in the vicinity of the head unit 820. As the painting apparatus 8000, an articulated robot having an appropriate number of axes such as 5 axes, 6 axes, or 7 axes can be used. The painting apparatus 8000 detects the position of the head unit 820 with respect to an object (in the present embodiment, the automobile) M by using the 3D sensor 830, and paints the object M by discharging paint onto the object M from the eight liquid discharge heads 30 of the head unit 820 while moving the robot arm 810 based on the detected results.

Although the embodiments of the present invention have been described above, the present invention is not limited to the above-described embodiments, and changes in design may be appropriately made without departing from the scope of the present invention.

In the present disclosure, a "liquid discharge apparatus" is an apparatus that includes a liquid discharge head or a head unit including the liquid discharge head, and that drives the liquid discharge head to discharge liquid. Examples of the liquid discharge apparatus include not only an apparatus capable of discharging liquid to an object to which the liquid can adhere, but also an apparatus configured to discharge liquid toward gas or liquid.

The "liquid discharge apparatus" may include devices for feeding, conveying, and ejecting a material to which liquid can adhere, as well as a pre-processing device, a post-processing device, and the like.

For example, the liquid discharge apparatus may be an imaging forming apparatus configured to form an image on a sheet by discharging ink, or may be a three-dimensional shaping apparatus configured to shape a three-dimensional object by discharging shaping liquid onto a powder layer formed of layers of powder.

The liquid discharge apparatus is not limited to an apparatus configured to discharge liquid to visualize meaningful images such as characters and figures. Examples of the liquid discharge apparatus include an apparatus configured to form patterns not meant to convey any meaning, three-dimensional images, and the like.

The above-described "material to which liquid can adhere" represents a material to which liquid can at least temporarily adhere, a material to which liquid adheres and is fixed, a material to which liquid adheres and penetrates, and the like. To be more specific, examples of the material to which liquid can adhere include a recording medium such as paper, recording paper, a recording sheet, a film, and a cloth, an electronic component such as an electronic substrate and a piezoelectric body, and a medium such as a powder layer, an organ model, and a cell for testing. The material to which liquid can adhere includes any material to which liquid adheres, unless particularly limited.

The material to which liquid can adhere may be any material to which liquid can adhere even temporarily, such as paper, threads, fibers, fabrics, leather, metal, plastic, glass, wood, and ceramics.

The "liquid" is not particularly limited and may be any liquid as long as the liquid has a viscosity and surface tension by which the liquid can be discharged from the head. Preferably, the liquid has a viscosity of 30 mPa·s or more under normal temperature and normal pressure or by heating or cooling. More specifically, examples of the liquid include a solution, a suspension, and an emulsion, including a solvent such as water and an organic solvent, a colorant such as a dye and a pigment, a functional material such as a polymerizable compound, a resin, and a surfactant, a biocompatible material such as DNA, amino acid, protein, and calcium, and an edible material such as a natural colorant. Such a solution, a suspension, and an emulsion can be used for inkjet ink, a surface treatment solution, a liquid for forming a component of an electronic element or a light-emitting element or an electronic circuit resist pattern, and a solution for three-dimensional shaping.

Further, the "liquid discharge apparatus" is an apparatus configured to relatively move the liquid discharge head and the material to which liquid can adhere, but is not limited thereto. Specific examples of the liquid discharge head include a serial-type apparatus that moves the liquid discharge head or a line-type apparatus that does not move the liquid discharge head.

Further, examples of the "liquid discharge apparatus" include a treatment liquid application apparatus configured to discharge treatment liquid to a sheet so as to apply the treatment liquid to the surface of the sheet for the purpose of modifying the surface of the sheet, and an injection granulation apparatus configured to inject, through nozzles, a composition liquid, in which raw materials are dispersed in a solution, to granulate fine particles of the raw materials.

In the present disclosure, the "head unit" is an apparatus that includes at least one liquid discharge head, a liquid supply channel for supplying liquid to the liquid discharge head, and a liquid supply port for supplying the liquid to the liquid supply channel.

What is claimed is:

1. A liquid discharge head comprising:
- a nozzle forming member having a nozzle configured to discharge liquid;
- an opening and closing member configured to open and close the nozzle;
- a piezoelectric body configured to expand and contract in an axial direction in response to a drive voltage so as to actuate the opening and closing member such that the nozzle is opened and closed;
- a first housing member having a cylindrical shape and configured to house the piezoelectric body;

a ground member configured to contact an inner side of the first housing member; and a ground wire, the ground member being electrically connected to the ground wire and the first housing member.

2. The liquid discharge head according to claim 1, further comprising a second housing member configured to be inserted into the first housing member, wherein the ground member is supported by the second housing member.

3. The liquid discharge head according to claim 2, wherein the second housing member and the ground member are integrally insertable into and removable from the first housing member.

4. The liquid discharge head according to claim 2, further comprising a supply wire configured to supply the drive voltage to the piezoelectric body, and a support member provided within the second housing member and configured to support the ground wire and the supply wire at mutually different positions as viewed in a direction in which the second housing member is inserted into the first housing member.

5. The liquid discharge head according to claim 1, wherein the ground member is elastically deformable, and the ground member contacts the inner side of the first housing member while being elastically deformed.

6. A liquid discharge apparatus comprising:

the liquid discharge head according to claim 1; and a driver configured to drive the liquid discharge head.

* * * * *